Feb. 15, 1938.                    G. NEMETZ                    2,108,724
                         LABYRINTH PACKING FOR BEARINGS
                              Filed Dec. 12, 1936
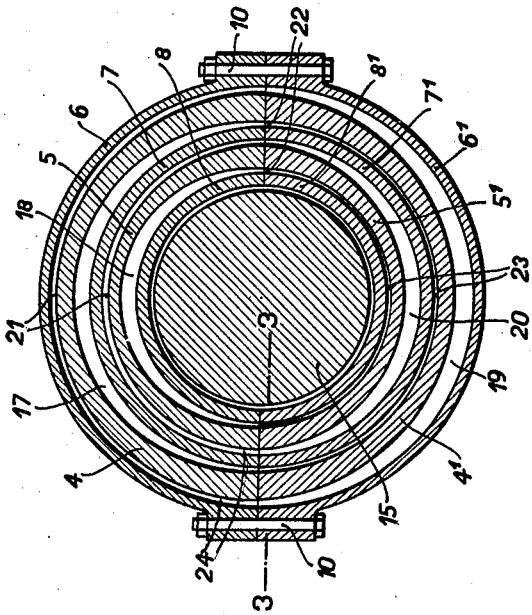
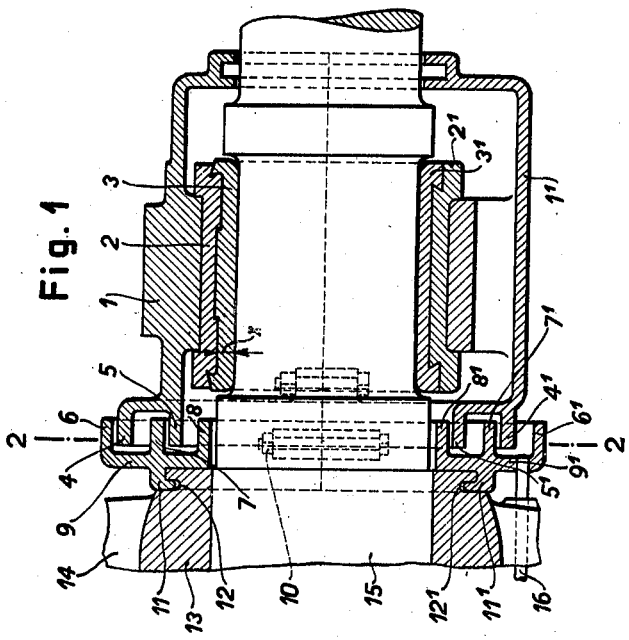
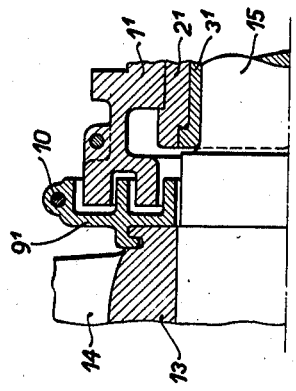
G. Nemetz
INVENTOR
By: Glascock Downing & Seebold
Attys.

Patented Feb. 15, 1938

2,108,724

UNITED STATES PATENT OFFICE 2,108,724

LABYRINTH PACKING FOR BEARINGS

Gustav Nemetz, Vienna, Austria, assignor to the firm Alex. Friedmann, Vienna, Austria Application December 12, 1936, Serial No. 115,627
In Austria December 21, 1935

4 Claims. (Cl. 286—5)

This invention relates to bearings and more particularly to labyrinth packings forming a seal at the end of the bearing through which the rotating shaft passes outwards, so as to prevent dust, water or the like from entering into the bearing.

In such labyrinth packings which comprise a plurality of stationary rings and a plurality of rotating rings inserted between the first named rings, the gaps provided between these rings should be as narrow as possible along their whole periphery so that the rotating and stationary rings are just effectively prevented from coming into contact with each other. Difficulties, however, arise in the event which may occur sometimes owing to the conditions of working that the lining of the bearing brass gets hot and melts during operation so that the casing of the bearing together with the stationary rings drops for a distance equal to the thickness of this lining. If the gap or gaps between the rings are too narrow under these circumstances the stationary rings would come into contact with the rotating rings whereby the bearing may be heavily damaged. Such conditions exist for instance in the axle bearings of railway vehicles.

A further difficulty arises in respect with the attachment of the labyrinth packing to the rotating shaft. Usually the rotating rings of the labyrinth packing are secured to the hub of a wheel or disk carried by the shaft immediately adjacent to the bearing. In collar bearings not only the casing of the bearing, but also the member carrying the rotating rings of the labyrinth must be subdivided into two parts in order to allow assembling or dismounting of the labyrinth packing and it is somewhat difficult to secure the two halves of this member to said hub in a simple and oil-tight manner.

An object of the present invention is to provide a labyrinth packing for bearings, wherein a narrow gap is provided between the rotating and stationary rings along the whole periphery of the same, the arrangement being such that when the stationary rings drop for the reasons above referred to, a contact between the rotating and stationary rings is effectively prevented. A further object of the invention is to provide a labyrinth packing wherein subdivided rotating rings are secured to the hub of a disk or wheel carried by the shaft immediately adjacent to the bearing, in a simple and oil-tight manner.

An embodiment of the present invention is illustrated by way of example in the accompanying drawing, in which Fig. 1 is a vertical longitudinal section through the bearing, Fig. 2 is a vertical cross-section according to line 2—2 in Fig. 1 and Fig. 3 is a partial horizontal longitudinal section according to line 3—3 in Fig. 2, showing the end of the bearing provided with the labyrinth packing.

As shown in the drawing, the bearing comprises a casing consisting of the upper part 1 and the lower part $1^1$ and the brass 2, $2^1$ and the interior lining 3, $3^1$, the brass and the lining being likewise subdivided into two parts. The labyrinth packing comprises the stationary rings 4, $4^1$ and 5, $5^1$ formed on the parts of the casing 1, $1^1$ respectively, and the rotating rings 6, $6^1$, 7, $7^1$ and 8, $8^1$ formed on the upper half 9 and the lower half $9^1$ of a labyrinth casing respectively. On these halves 9, $9^1$ connected together by means of bolts 10, there are provided annular ribs 11, $11^1$ the lateral surfaces of which engage with a close fit into corresponding annular grooves 12, $12^1$ formed in the hub 13 of a wheel 14 carried by the shaft or axle 15.

As will be seen from Figs. 1 and 3, the lateral surfaces of the rib 11, $11^1$ and of the groove 12, $12^1$ run perpendicularly to the axis of rotation and after tightening the screws 10 an oil-tight connection is established between the hub 13 and the labyrinth casing 9, $9^1$, this connection preventing any axial displacement of this casing relatively to the hub. The rib 11, $11^1$ engages into the groove 12, $12^1$ in such a manner that with the halves of the labyrinth casing 9, $9^1$ fitted together, a small clearance is still left between the circumference of the rib 11, $11^1$ and the bottom of the groove 12, $12^1$.

A bolt 16 screwed into the wheel 14 projects from the same so as to extend into a hole provided in the lower part $9^1$ of the labyrinth casing. By this means this casing is prevented from rotation relatively to the hub 13 also in the case wherein the friction existing between the rib 11, $11^1$ and the groove 12, $12^1$ would not be sufficient to prevent such rotation itself.

As shown in Fig. 2, the stationary rings, as well as the rotating rings are substantially circular and coaxial with one another, but the inner sides of the upper halves 4 and 5, and the outer sides of the lower halves $4^1$ and $5^1$ of the stationary rings recede from the circular form so that the width of these rings diminishes from the points situated in the horizontal plane containing the axis of rotation, in the direction to the uppermost and lowermost points of these rings. By these means lunular spaces 17, 18, 19, 20 are formed between the stationary and rotating rings, these spaces being of such width that when the lining 3, 3¹ of the bearing is melting and the casing 1, 1¹ together with the stationary rings 4, 4¹ and 5, 5¹ drops therefore for about the thickness "$x$" of the lining, these rings are allowed to enter into said lunular spaces to such an extent that gaps are still left which just prevent a contact between the stationary and rotating rings.

The vertical width of the lunular recesses of the stationary rings 4, 4¹ and 5, 5¹ is preferably made equal to the thickness of the lining of the bearing brass plus a minimum addition, whereby the smallest possible width of the above-mentioned labyrinth gap is determined.

As it is to be seen from Fig. 2, narrow gaps, as indicated at 21, 22, 23, and 24 are provided along the whole periphery of the rings so that the tightening or sealing effect of the labyrinth packing is substantially the same along its whole periphery.

What I claim is:—

1. In a bearing a labyrinth packing comprising circular rotating rings and circular stationary rings inserted between and coaxial with said rotating rings, the inner sides of the upper halves, and the outer sides of the lower halves of the stationary rings receding from the circular form so that the width of the stationary rings diminishes from the points situated in the horizontal plane containing the axis of rotation, upwards and downwards.

2. In a bearing a labyrinth packing comprising circular rotating rings and circular stationary rings inserted between and coaxial with said rotating rings, the width of said stationary rings decreasing from the points situated in the horizontal plane containing the axis of rotation, upwards and downwards so as to form lunular spaces between the stationary and rotating rings.

3. In a collar bearing a labyrinth packing comprising rotating rings, stationary rings inserted between the rotating rings, a carrier for said rotating rings, subdivided into two parts, a member carried by the shaft adjacent to the bearing, said carrier and said member being provided with an annular groove and an annular rib respectively, the groove and rib engaging with one another so as to prevent the said carrier from being axially displaced relatively to said member.

4. In a collar bearing a labyrinth packing comprising rotating rings, stationary rings inserted between said rotating rings, a carrier for said rotating rings, subdivided into two parts, a member carried by the shaft adjacent to the bearing, said carrier and said member being provided with an annular groove and an annular rib respectively, the groove and rib engaging with one another so as to prevent the said carrier from being axially displaced relatively to said member, and means secured to said member and engaging with the carrier to prevent the latter from being rotated relatively to said member.

GUSTAV NEMETZ.